US006517931B1

(12) United States Patent
Fu

(10) Patent No.: US 6,517,931 B1
(45) Date of Patent: Feb. 11, 2003

(54) SILVER INK FOR FORMING ELECTRODES

(75) Inventor: Bo Fu, Irvine, CA (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/977,623

(22) Filed: Oct. 15, 2001

(51) Int. Cl.$^7$ ................................................ B32B 3/00
(52) U.S. Cl. .................. 428/210; 501/32; 501/137; 501/138; 501/139; 501/152; 361/321.1; 361/321.3; 361/321.5
(58) Field of Search ................................ 501/136, 137, 501/32, 138, 139, 152; 361/321, 321.3, 321.1, 321.5; 428/210

(56) References Cited

U.S. PATENT DOCUMENTS

| | | | | |
|---|---|---|---|---|
| 4,379,319 A | | 4/1983 | Wilson | 361/321 |
| 4,506,026 A | * | 3/1985 | Hodgkins et al. | 501/135 |
| 4,628,404 A | * | 12/1986 | Yokoe et al. | 361/321 |
| 4,767,732 A | * | 8/1988 | Furukawa et al. | 501/137 |
| 4,818,736 A | * | 4/1989 | Yamashita et al. | 501/136 |
| 5,296,426 A | | 3/1994 | Burn | 501/139 |
| 5,550,092 A | | 8/1996 | Chu | 501/137 |
| 5,780,375 A | * | 7/1998 | Drozdyk | 501/137 |
| 5,897,912 A | | 4/1999 | Shaikh | 427/79 |

* cited by examiner

Primary Examiner—Cathy Lam
(74) Attorney, Agent, or Firm—Rankin, Hill, Porter & Clark LLP

(57) ABSTRACT

The present invention provides an electrode ink composition and a method of using the same. The ink comprises a silver powder, a vehicle and an inhibitor. The silver powder is preferably free of palladium and gold and comprises particles having a maximum particle size of less than or equal to about 1 $\mu$m. The inhibitor comprises a powdered ceramic metal oxide composition comprising particles having a maximum particle size of less than or equal to about 0.9 $\mu$m.

9 Claims, No Drawings

SILVER INK FOR FORMING ELECTRODES

FIELD OF INVENTION

The present invention concerns a silver ink for use in forming the electrodes of a low temperature fired multilayer ceramic capacitor.

BACKGROUND OF THE INVENTION

Multilayer ceramic capacitor (MLC) devices are well-known in the electronics industry. MLC devices are commonly fabricated from dielectric green tapes and electrically conductive inks that usually contain mixtures of the metals silver and palladium. Typically, the electrically conductive silver-palladium inks are screen printed in a desired pattern upon the green tapes. The printed green tapes are stacked together to form a registry and then laminated under pressure to form a monolithic structure. The monolithic structure is then fired (conventionally at a temperature of about 1250° C.) to form the MLC device.

In recent years, ceramic dielectric materials have been developed that can be fired in the range of about 880° C. to about 925° C. Because of the lower firing temperatures, attempts have been made to lower the palladium content of the conductive inks used to form the electrodes. Palladium is much more expensive than silver, so minimizing its use can result in large cost savings. Unfortunately, attempts to formulate conductive inks comprising 100% silver have been met with limited success. The primary problems. have been poor adhesion, silver migration, silver diffusion, and/or decreased electrical performance.

SUMMARY OF INVENTION

The present invention provides a new and improved conductive silver ink for use in forming the electrodes of a low temperature fired MLC device. The ink of the present invention displays excellent adhesion and electrical properties. In a preferred embodiment, the ink comprises silver powder, a vehicle and an inhibitor. The silver powder comprises particles having a maximum particle size of less than or equal to about 1 $\mu$m. The inhibitor preferably comprises a barium titanate based ceramic composition comprising particles having a maximum size of less than or equal to about 0.9 $\mu$m. The present invention also provides a novel low temperature fired multilayer ceramic capacitor and method for forming the same.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The conductive ink of the present invention comprises silver powder, a vehicle, and an inhibitor. The ink of the present invention is free of palladium, gold or any metal other than silver. Preferably, the ink also includes a stabilizer and/or antioxidant. Other additives such as dispersants and thixotropes may also be included.

The silver powder used in the ink according to the present invention may be obtained from a variety of commercially available sources. For example, a suitable silver powder is available from the Engineered Powders Division of Technic Inc. of Woonsocket, Rhode Island under the trade designation SILSPHERE™ 514 silver powder. Such powder displays an average particle diameter of from about 0.4 to 1.0 $\mu$m and a purity in excess of about 99.5% by weight. Silver powder may be obtained from other commercial sources, however the utilization of a silver powder having an average particle size of less than or equal to about 1 $\mu$m has been found to be a critical aspect of the ink.

The inhibitor employed in the present invention preferably comprises a ceramic metal oxide. Preferably, such inhibitor comprises a barium titanate based material. More particularly, preferably the inhibitor has a composition the same or similar to the dielectric powder utilized to form the green tape.

The inhibitor serves to help promote compatible expansion rates and adhesion between the dielectric and electrode layers subsequent to firing. The inhibitor preferably has a maximum particle size of less than or equal to about 0.9 $\mu$m. As previously noted, a suitable source for the inhibitor may be the dielectric powder used to form dielectric tape. It will be appreciated that milling of the powder may be required so as to provide the proper particle size for the inhibitor.

One example of a suitable dielectric powder that may be used to form green tape as well as be used as the inhibitor in an ink composition according to the present invention is a low temperature dielectric powder comprising primarily a mixture of barium titanate and neodymium oxide sold by the Ferro Corporation of Cleveland, Ohio, under the trade designation ULF X7R. Such powder fires in the 880° C. to 925° C. temperature range. Such powder has a particle size (d50) of about 0.84 $\mu$m. The inhibitor may also be supplied in the form of a coating on the silver powder. $ZrO_2$ coated silver powders are commercially available from the Degussa Corporation of South Plainfield, N.J.

The vehicle used in the ink composition according to the present invention preferably comprises a mixture of resin and solvent. The preferred resin/solvent mixture comprises a 10 weight percent solution of ethyl cellulose in an 80/20 (wt. %) mixture of toluene/ethanol. Other suitable solvents for use in formulating the vehicle include, for example, ethylhexanol and/or an dearomatized aliphatic sold under the trademark Exxsol D70 by Exxon Chemical Company.

The ink preferably comprises a stabilizer/antioxidant such as, for example, Ciba-Geigy's Irganox MD-1024. Of course, any one or combination of conventional stabilizers/antioxidants may be employed. Stabilizers/antioxidants serve to preserve the shelf life of the ink helping to prevent any time related deterioration of the system. The ink may also include other conventional additives such as thixotropes and dispersants. These types of additives are commonly employed in electronic inks and are well-known in the art.

The ink of the present invention is prepared by mixing the various components together, for example, using a three roll mill. After milling, the ink composition is filtered to remove large particles and agglomerations. Preferably, the filter has a maximum opening size of about 1 $\mu$m. Filtering is critical in order to ensure that the ink does not contain silver particles in excess of 1 $\mu$m.

Low temperature fired MLC devices may be formed using the ink composition of the present invention. Such capacitors are formed by providing multiple layers of green dielectric tape and then depositing the ink upon the layers of tape. The ink may be deposited using any one of a variety of conventional techniques, such as screen printing. Once the tapes are coated with ink, the tapes are stacked in a registry and laminated to form a monolith. The monolith is then fired at a temperature of from about 86 to about 940° so as to form a capacitor. Applicants hereby incorporate by reference U.S. Pat. No. 5,296,426 (especially col. 7, lines 26 to col. 8, line 3) and U.S. Pat. No. 4,379,319 (especially FIG. 2) for their general teachings regarding the fabrication of MLC devices.

The following examples are intended only to illustrate the invention and should not be construed as imposing limitations upon the claims.

EXAMPLE I

Ink Compositions A, B, C, and D were prepared by mixing the components listed in Table I below in parts by weight using a three-roll mill for three hours and then filtering the mixture through a 1 μm filter:

TABLE I

| INK COMPOSITION | A | B | C | D |
|---|---|---|---|---|
| Silver Powder | | | | |
| Technic Silsphere 514 | 50 | | | |
| PGP 7000 ID | | 50 | | |
| Degussa 7000 C | | | 50 | |
| Degussa 11000 SP | | | | 50 |
| Inhibitor | | | | |
| ULF X7R Powder* | 4 | 4 | 4 | 4 |
| Resin Solution | | | | |
| 10 (wt. %) Ethyl Cellulose (low MW) in 80/20 Toluene/Ethanol | 21 | 21 | 21 | 21 |
| 10 (wt. %) Ethyl Cellulose (high MW) in 80/20 Toluene/Ethanol | 21.5 | 215 | 21.5 | 21.5 |
| Antioxidant | | | | |
| Irganox MD-1024 | 0.5 | 0.5 | 0.5 | 0.5 |
| Solvent | | | | |
| Ethylhexanol | 1.7766 | 1.7766 | 1.7766 | 1.7766 |
| Exxsol D70 - Exxon | 0.2234 | 0.2234 | 0.2234 | 0.2234 |
| Additives | | | | |
| Thixotrope (Thixatrol 1) | 0.5 | 0.5 | 0.5 | 0.5 |
| Dispersant (Solsperse 13940) | 0.5 | 0.5 | 0.5 | 0.5 |

*milled to a maximum particle size of 0.5 μm.

EXAMPLE II

A slip for casting into dielectric green tape was prepared by mixing the components shown in Table II below in a 250 ml ball mill:

TABLE II

| Component | Amount |
|---|---|
| ULF X7R powder* | 140 grams |
| Toluene | 30 grams |
| Methanol | 20 grams |
| M1135 Dispersant* | 1.6 grams |
| M1125 Plasticizer* | 1.6 grams |

*Available from Ferro Corporation

The mixture was milled for about two hours at 150 RPM using 175 grams of 0.5" zirconia media. 43.4 grams of B74001 binder solution (≡36.5% PVB resin) was added to the mixture, which was then mixed for about 6–8 hours. The mixture was then filtered through a 5 μm nominal filter and then cast using a conventional tape caster to form green sheets of about 6 mils in thickness.

EXAMPLE III

Ink Composition A from Example I was screen printed onto green tapes formed according to the process described in Example II. The printed layers of green tape were then stacked into a registry and laminated into a monolith and fired. A conventional termination paste (TM63-120) was then applied. The monolith was then heated through a conventional binder burn out cycle and then fired at about 925° C. with a 4 hour soak to form an MLC device. The same process was repeated three times, except that Ink Compositions B, C, and D from Example I, respectively, were used instead of Ink Composition A. Each of the MLC devices formed exhibited a capacitance of greater than 140,000 pF and a dissipation factor of less than about 2.5% at 6 μm.

EXAMPLE IV

Multilayer Ceramic Capacitor (MLC) Devices 1, 2, 3 and 4 were formed in the same manner as described in Example III above using the dielectric green tape formed according to Example II. The conductive inks used to fabricate MLC Devices 1, 2, 3 and 4 had the same formulation as Ink Composition A in Example I, except that the conductive inks contained the metal(s) and inhibitor(s) shown in Table III below:

TABLE III

| MLC Device Conductive Ink | 1 | 2 | 3 | 4 |
|---|---|---|---|---|
| Metal(s) | 54 parts by weight of 90/10 (wt. %) Ag/Pd | 50 parts by weight of Ag (100%) | 50 parts by weight of Ag (100%) | 50 parts by weight of Ag* |
| Inhibitors | None | 4 parts by weight of ULF X7R** | 4 parts by weight of $ZrO_2$** | $ZrO_2$* |

*Degussa silver powder coated with 2000 ppm $ZrO_2$
**milled to a maximum particle size of 0.5 μm.

MLC Devices 1, 2, 3 and 4 were 120 mils×60 mils (1206 case size) in size and had 35 layers each having a fired thickness of 8.25 μm, 10 μm, 10 μm, and 10 μm, respectively. MLC Device 1 was a control (the conductive ink contained Pd). The electrical performance of MLC Devices 1, 2, 3 and 4 was measured and the results are reported in Table IV below:

TABLE IV

| MLC Device | 1 | 2 | 3 | 4 |
|---|---|---|---|---|
| Capacitance | 207,530 pF | 158,897 pF | 147,031 pF | 140,307 pF |
| Dissipation Factor | 1.95% at 5 μm | 1.85% at 5 μm | 1.61% at 5 μm | 1.68% at 5 μm |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A low temperature fired multilayer ceramic capacitor device comprising a plurality of layers of dielectric material having electrically conductive electrodes formed there between, said multilayer ceramic capacitor device being formed by a process comprising:

(i) providing a plurality of layers of green dielectric tape;

(ii) providing a conductive ink composition comprising a silver powder, a vehicle and an inhibitor, said silver powder having a maximum particle size of less than about 1.0 μm, and said inhibitor comprising a powdered ceramic metal oxide composition having particles having a maximum particle size of less than about 0.9 μm;

(iii) depositing said conductive ink composition upon said layers of green dielectric tape, said conductive ink composition being arranged on said layers of green dielectric tape so as to form conductive electrodes upon firing;

(iv) stacking said layers of green dielectric tape in a registry and laminating said layers of green dielectric tape together to form a monolith; and (v) firing said monolith at a temperature of from about 860° C. to about 940° C.

2. The multilayer ceramic capacitor device as set forth in claim 1 wherein said powdered ceramic metal oxide composition in said conductive ink composition comprises barium titanate.

3. The multilayer ceramic capacitor device as set forth in claim 2 wherein said powdered ceramic metal oxide composition in said conductive ink composition further comprises neodymium oxide.

4. The multilayer ceramic capacitor device as set forth in claim 1 wherein said powdered ceramic metal oxide composition in said conductive ink composition comprises zirconium oxide.

5. The multilayer ceramic capacitor device as set forth in claim 1 wherein said multilayer ceramic capacitor device is formed by said process further comprising filtering said ink composition through a filter having a maximum opening size or about 1.0 μm.

6. The multilayer ceramic capacitor device as set forth in claim 1 wherein said conductive ink composition is free of palladium.

7. The multilayer ceramic capacitor device as set forth in claim 1 wherein said conductive ink composition is free of gold.

8. A low temperature fired multilayer ceramic capacitor device comprising a plurality of layers of dielectric material having electrically conductive electrodes formed therebetween, said multilayer ceramic capacitor device being formed by a process comprising:

(i) providing a plurality of layers of green dielectric tape;

(ii) providing a conductive ink composition comprising a silver powder, a vehicle and an inhibitor, said silver powder having a maximum particle size of less than about 1.0 μm, and said inhibitor comprising a powdered ceramic metal oxide composition having particles having a maximum particle size of less than about 0.9 μm;

(iii) depositing said conductive ink composition upon said layers of green dielectric tape, said conductive ink composition being arranged on said layers of green dielectric tape so as to form conductive electrodes upon firing;

(iv) stacking said layers of green dielectric tape in a registry and laminating said layers of green dielectric tape together to form a monolith; and (v) firing said monolith at a temperature of from about 860° C. to about 940° C.;

wherein said conductive ink composition is free of palladium and gold.

9. A low temperature fired multilayer ceramic capacitor device comprising a plurality of layers of dielectric material having electrically conductive electrodes formed therebetween, said multilayer ceramic capacitor device being formed by a process comprising:

(i) providing a plurality of layers of green dielectric tape;

(ii) providing a conductive ink composition comprising a silver powder, a vehicle and an inhibitor, said silver powder having a maximum particle size of less than about 1.0 μm, and said inhibitor comprising a powdered ceramic metal oxide composition having particles having a maximum particle size of less than about 0.9 μm;

(iii) depositing said conductive ink composition upon said layers of green dielectric tape, said conductive ink composition being arranged on said layers of green dielectric tape so as to form conductive electrodes upon firing;

(iv) stacking said layers of green dielectric tape in a registry and laminating said layers of green dielectric tape together to form a monolith; and (v) firing said monolith at a temperature of from about 860° C. to about 940° C.;

wherein said powdered ceramic metal oxide composition is the same as the material used to form said green dielectric tape.

* * * * *